(12) United States Patent
Dry et al.

(10) Patent No.: US 10,543,631 B2
(45) Date of Patent: Jan. 28, 2020

(54) METHOD OF FORMING A HEADSET ASSEMBLY

(71) Applicant: Ford Global Technologies, LLC, Dearborn, MI (US)

(72) Inventors: Alan George Dry, Grosse Pointe Woods, MI (US); Marcos Silva Kondrad, Macomb Township, MI (US); Kevin Wayne Preuss, Berkley, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/175,130

(22) Filed: Oct. 30, 2018

(65) Prior Publication Data

US 2019/0061215 A1 Feb. 28, 2019

Related U.S. Application Data

(62) Division of application No. 15/447,650, filed on Mar. 2, 2017, now Pat. No. 10,179,433.

(51) Int. Cl.
*B29C 45/14* (2006.01)
*B60N 2/80* (2018.01)
(Continued)

(52) U.S. Cl.
CPC .... *B29C 45/14836* (2013.01); *B29C 45/0001* (2013.01); *B29C 45/0025* (2013.01);
(Continued)

(58) Field of Classification Search
CPC ............ B29C 45/0001; B29C 45/0025; B29C 45/14836; B29C 45/2606; B29C 45/40; B29C 49/0005; B29C 49/041; B29C 49/20; B29C 49/48; B29C 49/70; B29C 2045/1445; B29C 2049/2004; B29C 2049/2047; B29K 2023/12; B29K 2705/02; B29L 2031/3023; B60N 2/80; B60N 2/809; B60N 2002/899
See application file for complete search history.

(56) References Cited

U.S. PATENT DOCUMENTS 3,891,022 A * 6/1975 Cola ....................... B22C 7/005
164/235
4,559,094 A 12/1985 Hostetler et al.
(Continued)

*Primary Examiner* — James M Ference
(74) *Attorney, Agent, or Firm* — Vichit Chea; Price Heneveld LLP

(57) ABSTRACT

A method of forming a headrest assembly includes providing a first mold that encloses a first cavity in a closed condition. A support is positioned in the first cavity. A first material is blow molded into the first cavity and around a portion of the support to form a core part. The core part and support are removed from the first mold. A second mold encloses a second cavity in a closed condition. The core part and the support are placed into the second mold in an open condition. A fluid is injected into the core part through the support. The second mold is converted to the closed condition. A second material is injection molded into the second cavity and around the core part to form an outer shell around the core part. A fluid is withdrawn from the core part through the support.

20 Claims, 14 Drawing Sheets

(51) Int. Cl.
*B29C 45/00* (2006.01)
*B29C 45/26* (2006.01)
*B29C 45/40* (2006.01)
*B29C 49/00* (2006.01)
*B29C 49/04* (2006.01)
*B29C 49/20* (2006.01)
*B29C 49/48* (2006.01)
*B29C 49/70* (2006.01)
*B29K 23/00* (2006.01)
*B29K 705/02* (2006.01)
*B29L 31/30* (2006.01)

(52) U.S. Cl.
CPC .......... *B29C 45/2606* (2013.01); *B29C 45/40* (2013.01); *B29C 49/0005* (2013.01); *B29C 49/041* (2013.01); *B29C 49/20* (2013.01); *B29C 49/48* (2013.01); *B29C 49/70* (2013.01); *B60N 2/80* (2018.02); *B29C 2049/2004* (2013.01); *B29C 2049/2047* (2013.01); *B29K 2023/12* (2013.01); *B29K 2705/02* (2013.01); *B29L 2031/3023* (2013.01); *B60N 2002/899* (2018.02)

(56) References Cited

U.S. PATENT DOCUMENTS

| | | | |
|---|---|---|---|
| 4,738,809 A | 4/1988 | Storch | |
| 4,830,793 A | 5/1989 | Fermigier et al. | |
| 4,891,081 A | 1/1990 | Takahashi et al. | |
| 4,923,378 A | 5/1990 | Omata et al. | |
| 5,122,324 A * | 6/1992 | Yong-sup | A63B 53/04 264/513 |
| 5,165,754 A | 11/1992 | Louys | |
| 5,190,707 A | 3/1993 | Yanagishita | |
| 5,257,853 A | 11/1993 | Elton et al. | |
| 5,316,372 A | 5/1994 | Amner | |
| 5,398,996 A | 3/1995 | Steiner | |
| 5,405,190 A | 4/1995 | Jeffcoat et al. | |
| 5,452,939 A | 9/1995 | Kupisz et al. | |
| 5,478,136 A | 12/1995 | Takeuchi et al. | |
| 5,575,533 A | 11/1996 | Glance | |
| 5,681,087 A | 10/1997 | Yamano et al. | |
| 5,700,057 A | 12/1997 | De Filippo | |
| 5,730,917 A | 3/1998 | Ishikawa et al. | |
| 5,855,831 A | 1/1999 | Takei | |
| 5,874,030 A | 2/1999 | Takeuchi et al. | |
| 5,906,414 A | 5/1999 | Rus | |
| 5,927,814 A | 7/1999 | Yoshimura | |
| 5,984,414 A | 11/1999 | Adachi et al. | |
| 6,056,358 A | 5/2000 | De Filippo | |
| 6,120,100 A | 9/2000 | Palazzolo et al. | |
| 6,183,045 B1 | 2/2001 | Marfilius et al. | |
| 6,200,506 B1 | 3/2001 | Takei | |
| 7,390,555 B2 | 6/2008 | Shane | |
| 7,537,282 B2 | 5/2009 | Veine et al. | |
| 8,398,173 B2 | 3/2013 | Morilhat et al. | |
| 9,375,870 B2 | 6/2016 | Ohtsuka | |
| 2007/0257537 A1 | 11/2007 | Asbury | |
| 2012/0261967 A1 | 10/2012 | Ahlbrand et al. | |
| 2014/0191554 A1 | 7/2014 | Dublan et al. | |
| 2014/0374940 A1 | 12/2014 | Tabata et al. | |
| 2015/0239376 A1 | 8/2015 | Hunt | |
| 2015/0298372 A1 | 10/2015 | Bielsa et al. | |

\* cited by examiner

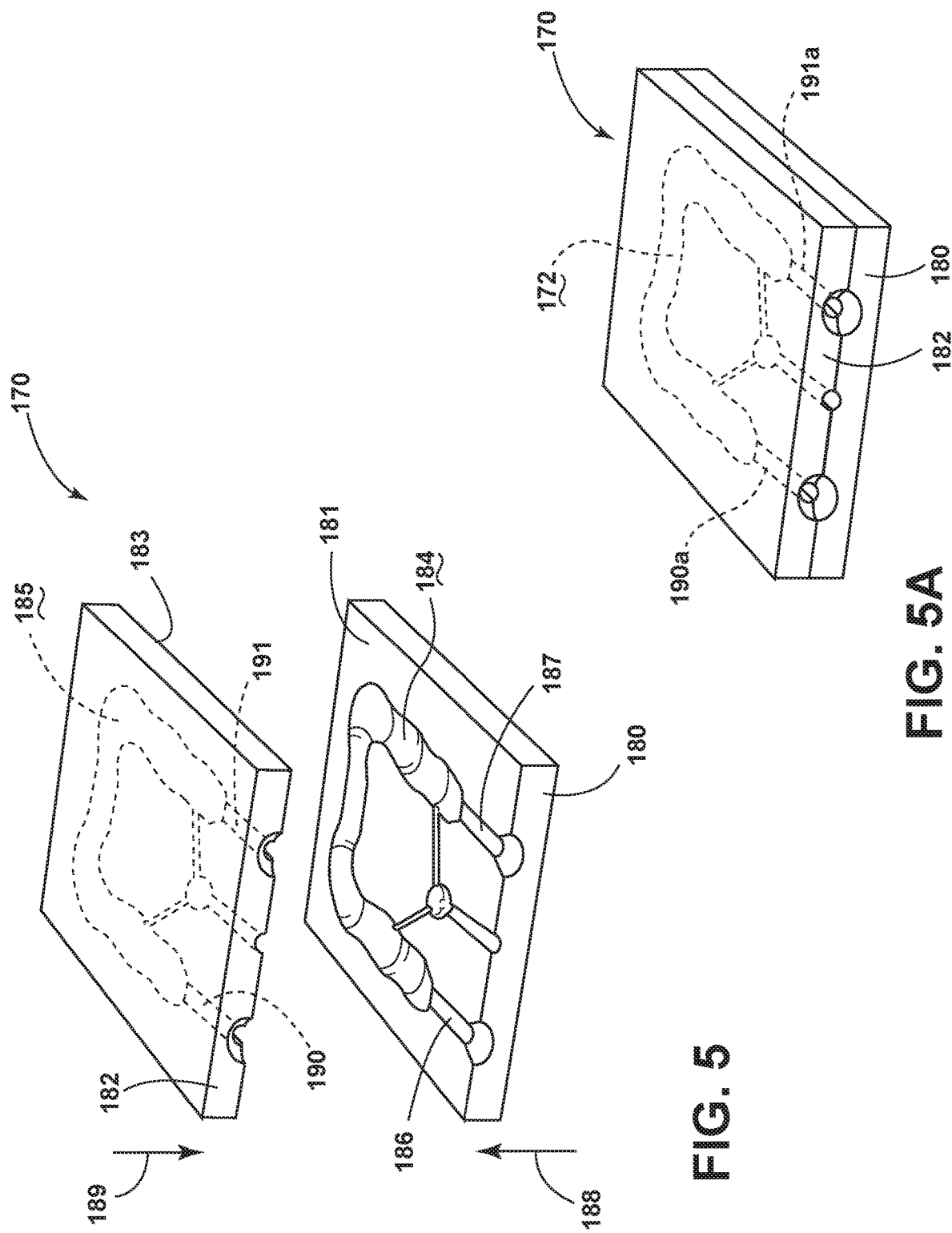

METHOD OF FORMING A HEADSET ASSEMBLY

CROSS-REFERENCE TO RELATED APPLICATION

This application is a divisional of and claims priority to U.S. patent application Ser. No. 15/447,650, now issued as U.S. Pat. No. 10,179,433, filed on Mar. 2, 2017, entitled "METHOD OF FORMING A HEADREST ASSEMBLY," the disclosure of which is hereby incorporated herein by reference in its entirety.

FIELD OF THE DISCLOSURE

The present disclosure generally relates to a headrest assembly, and more particularly to a method of forming a headrest assembly.

BACKGROUND OF THE DISCLOSURE

In the automotive industry, a number of headrests or head restraints are available on vehicle seats that are made in various ways to achieve various needs. It is advantageous to have headrests that are light weight, strong, and easy to manufacture. Thus, a headrest assembly that is light weight, strong and easy to manufacture is desired.

SUMMARY OF THE DISCLOSURE

According to one aspect of the present disclosure, a method of forming a headrest assembly is provided. The method includes providing a first mold that encloses a first cavity in a closed condition and includes a first hole of the first cavity. A support is positioned in the first hole of the first cavity and in the first cavity. The support includes a first support portion having a first aperture disposed within the first cavity and also includes a second support portion having a second aperture. The method also includes blow molding a first material into the first cavity and around a portion of the first support portion to form a core part and removing the core part and support from the first mold. Also included in the method are providing a second mold that encloses a second cavity in a closed condition and includes a first hole of the second cavity for receiving the support and placing the core part and a portion of the first support portion into the second mold in an open condition. A fluid is injected into the core part through the support. The second mold is converted to the closed condition. A second material is injection molded into the second cavity and around the core part to form an outer shell around the core part. The fluid is withdrawn from the core part through the support. The core part and the outer shell are removed from the second mold.

Embodiments of the first aspect of the disclosure can include any one or a combination of the following features:
the blow molding a first material into the first cavity and around a portion of the first support portion to form a core part comprises injecting air into the first cavity through the support;
the injecting air into the first cavity through the support comprises injecting air into the first cavity to inflate a parison;
injecting a fluid into the core part through the support comprises injecting water or oil into the core part through the support;
releasing compressed air into the core part through the support to remove the fluid;
the step of positioning a support in the first hole of the first cavity further comprises positioning a first support in the first hole of the first cavity and positioning a second support in a second hole of the first cavity and wherein the step of providing a second mold that encloses a second cavity in a closed condition and includes a first hole of the second cavity for receiving the support further comprises positioning the first support in the first hole of the second cavity and positioning the second support in a second hole of the second cavity;
blow molding a first material into the first cavity and around a portion of the first support portion to form a core part comprises injecting air into the first cavity through the first support and the second support;
injecting a fluid into the core part through the support further comprises injecting the fluid through the first support;
evacuating the fluid from the core part through the support further comprises evacuating the fluid through the second support;
blow molding a first material into the first cavity and around a portion of the first support portion to form a core part comprises blow molding a polypropylene into the first cavity and around a portion of the first support portion to form a core part;
the injection molding a second material into the second cavity and around the core part to form an outer shell around the core part comprises injection molding a thermoplastic olefin into the second cavity and around the core part to form an outer shell around the core part;
the step of positioning a support in the first hole of the first cavity further comprises positioning a first support in the first hole of the first cavity and positioning a second support in a second hole of the first cavity wherein a crossbar connects the first support and the second support and wherein the step of providing a second mold that encloses a second cavity in a closed condition and includes a first hole of a second cavity for receiving the support further comprises positioning the first support in the first hole of the second cavity and positioning the second support in a second hole of the second cavity; and
injection molding a second material into the second cavity and around the core part to form an outer shell around the core part comprises increasing the temperature of the fluid to increase the volume of the fluid to press the A-surface of the outer shell into the second cavity wall to minimize shrink defects.

According to another aspect of the present disclosure, a method for injection molding a part includes filling a hollow core part with a fluid. The method further includes injection molding an outer shell around the hollow core part and removing the fluid from the hollow core part.

Embodiments of the second aspect of the disclosure can include any one or a combination of the following features:
blow molding the hollow core part;
forming the hollow core part for insertion into a headrest; and
forming the hollow core part from aluminum.

According to another aspect of the present disclosure, a headrest assembly includes supports that are hollow. The supports have a first portion that includes a first aperture within a cavity and a second portion that includes a second aperture. There is a cavity within the core part. An outer shell encapsulates the core part. The core part is mounted on the supports.

Embodiments of the third aspect of the disclosure can include any one or a combination of the following features:
the core part and the outer shell have a generally u-shaped configuration; and
the supports comprise two supports with a knurled surface.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5 is a perspective view of the second mold in an open condition of one embodiment of the present disclosure;

FIG. 5A is a perspective view of the second mold in a closed condition of one embodiment of the present disclosure;

DETAILED DESCRIPTION

Figure 1:
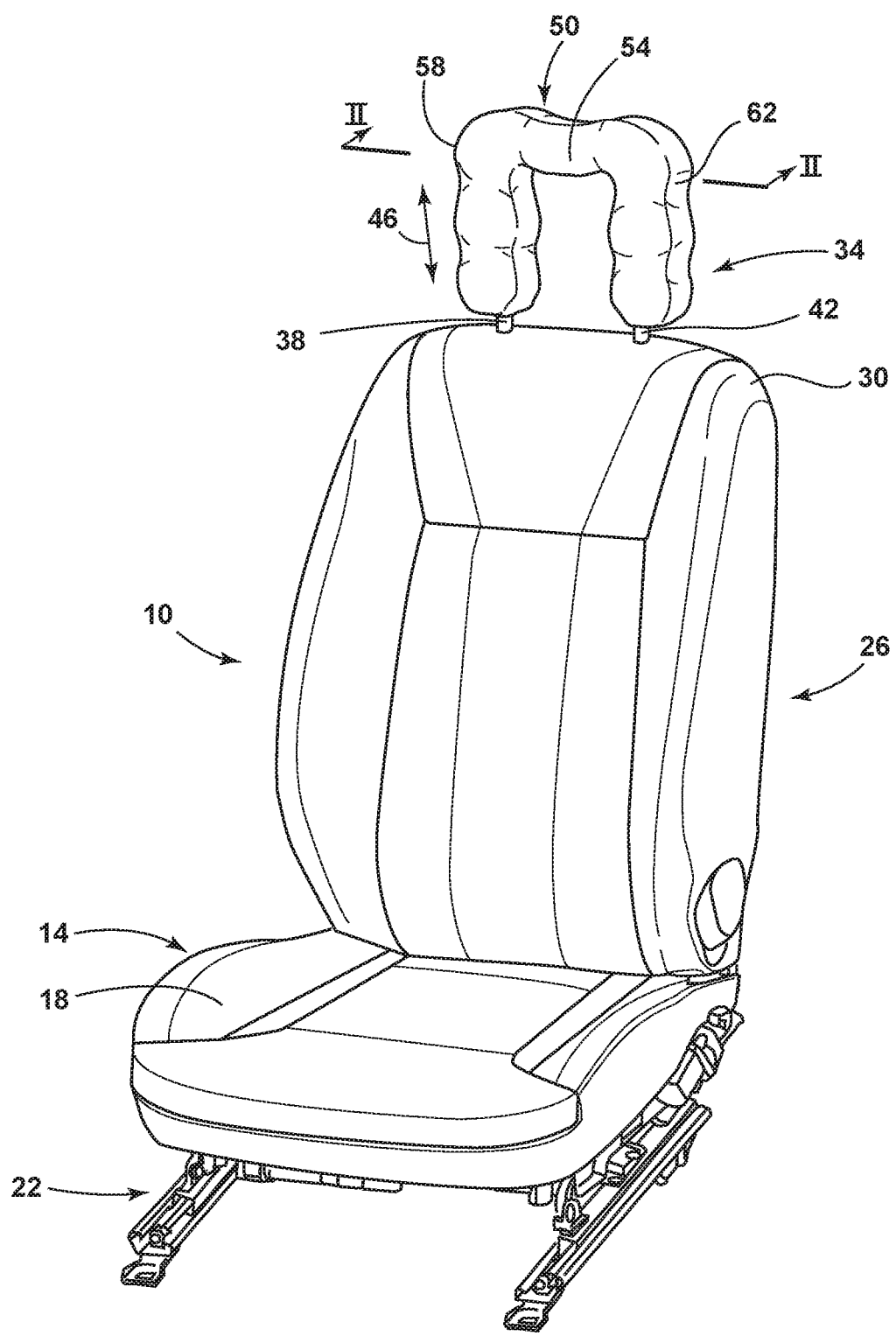
FIG. 1 is a front perspective view of a vehicle seat having a headrest assembly according to one embodiment of the present disclosure.

For purposes of description herein, the terms, "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-7, a method of forming a headrest assembly 34 comprises several steps. A first mold 87 encloses a first cavity 87a in a closed condition and includes a first hole 94a of the first cavity. A first support 38 is positioned in the first hole 94a of the first cavity and in the first cavity 87a. The first support 38 includes a first support portion 39 having a first aperture 132 disposed within the first cavity 87a and further includes a second support portion 40 having a second aperture 130. A first material is blow molded into the first cavity 87a and around a portion 71 of the first support portion 39 to form a core part 70. The core part 70 and support 38 are removed from the first mold.

A second mold 170 encloses a second cavity 172 in a closed condition and includes a first hole 190a of the second cavity. The core part 70 and a portion of the first support portion 39 are placed in the second mold 170 in an open condition. A fluid is injected into the core part 70 through the support 38. The second mold 170 is converted to the closed condition. A second material is injection molded into the second cavity 172 and around the core part 70 to form an outer shell 82 around the core part 70. A fluid is withdrawn from the core part 70. The core part 70 and outer shell 82 are removed from the second mold 170.

Referring now to FIG. 1, the reference numeral 10 generally designates a vehicle seat assembly as illustrated in accordance with an embodiment of the present disclosure. The vehicle seat 10 may be a driver seat or any other passenger seat, such as a first row seat, a second row seat or any subsequent row seat. The vehicle seat 10 includes a seat portion 14 with a cushion member 18 for supporting a vehicle occupant thereupon. A track assembly 22 is coupled to the seat portion 14 and contemplated to be secured to a floor surface of a vehicle for moving the vehicle seat 10 between fore and aft positions. The vehicle seat 10 also includes a seatback 26 extending upwardly from a rear portion of the seat portion 14 for supporting a torso of the vehicle occupant. The seatback 26 includes an upper portion 30 having a headrest assembly 34 adjustably mounted thereto. The headrest assembly 34 is supported by first and second support struts 38, 42 slidably received in the seatback 26 at the upper portion 30 thereof. The first and second support struts 38, 42 are configured to adjustably move the headrest assembly 34 in a substantially vertical direction as indicated by arrow 46. In use, the seatback 26 is configured to support a head of a vehicle occupant when the vehicle occupant rests his or her head against the headrest assembly 34. Although an individual vehicle seat 10 is illustrated in the embodiment of FIG. 1, it is contemplated that any size vehicle seat 10 may be utilized, such as a bench seat, which may include one or more headrest assemblies.

As further shown in FIG. 1, the headrest assembly 34 includes a centrally disposed headrest bun 50 and support struts 38, 42. In the depicted embodiment, headrest bun 50 includes a middle portion 54 disposed between first and second side portions 58, 62. In the depicted embodiment, support struts 38, 42 are coupled to first and second side portions 58, 62 of headrest bun 50. In the depicted embodiment, the headrest bun 50 has a generally u-shaped configuration. In various embodiments, it is contemplated that bun 50 may be a volumetric rectangular, elliptical, oval, or other shape known to those of skill in the art.

Figure 2:
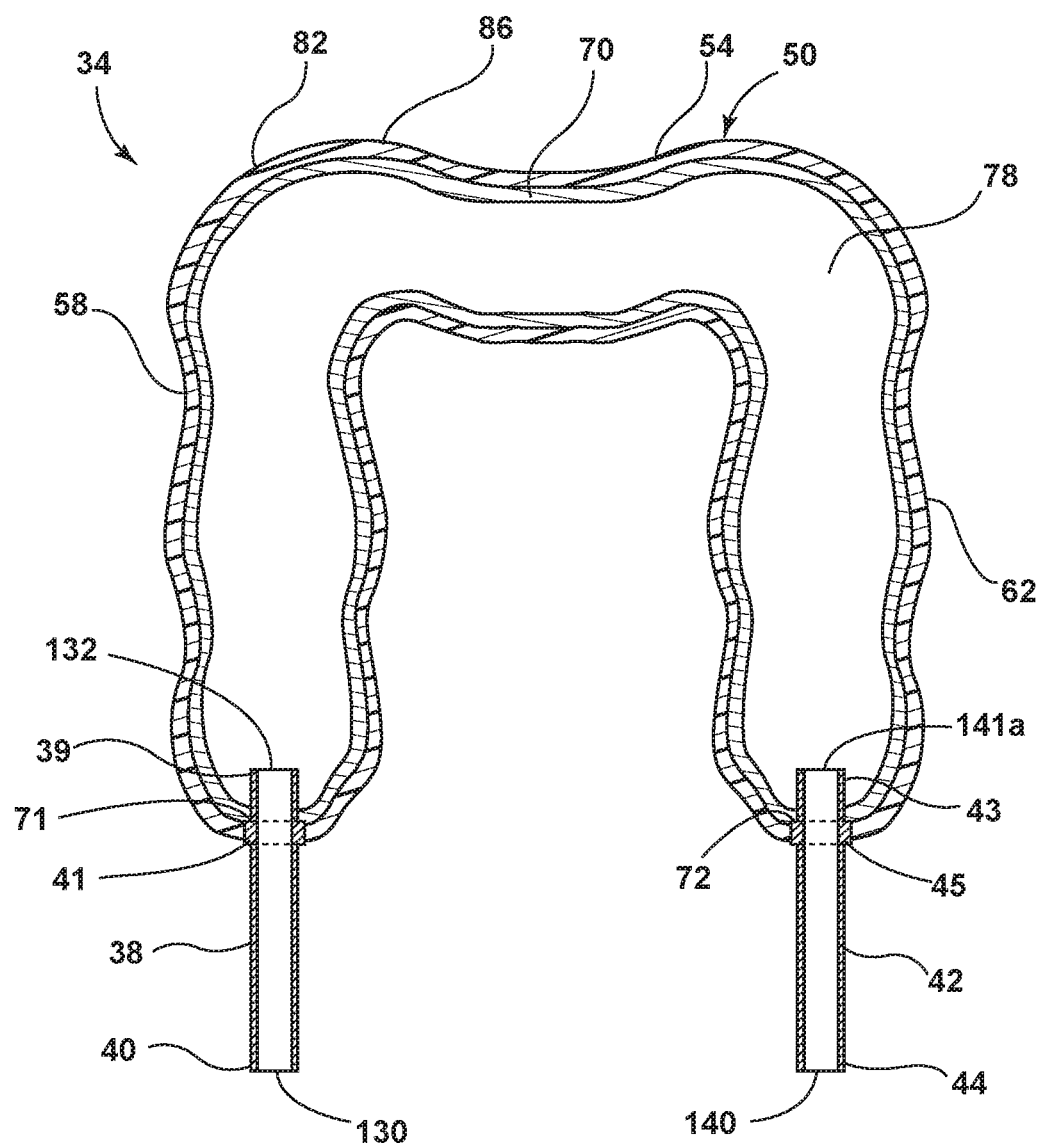
FIG. 2 is a cross-sectional view of a headrest assembly, such as depicted in FIG. 1, through line 2-2 according to one embodiment of the present disclosure.

FIG. 2 is a cross-sectional view of the headrest assembly 34 taken along lines 2-2 of FIG. 1. The headrest assembly 34 may be made using a multistep forming process. Headrest assembly 34 comprises bun 50, first support strut 38, and second support strut 42. Bun 50 includes middle portion 54, first side portion 58, and second side portion 62. In the depicted embodiment, the bun 50 comprises core part 70 and overmolded outer shell 82. First support strut 38 includes first support portion 39 and second support portion 40. Second support strut 42 includes first support portion 43 and second support portion 44. In the depicted embodiment, first support strut 38 and second support strut 42 are hollow cylinders. First protrusion 41 surrounds first support strut 38, and second protrusion 45 surrounds second support strut 42. With reference to FIGS. 2, 3-3B, 5-6D, first protrusion 41 and second protrusion 45 may be washer shaped and may have knurled surfaces to allow first mold 87 and second mold 170 to squeeze around the roughened, heavily textured, knurled surfaces of first protrusion 41 and second protrusion 45 to form a water tight mechanical seal with first mold 87 and second mold 170. Core part 70 is blow molded around first portion 39 of first support strut 38 and first portion 43 of second support strut 42. Hollow portion 78 is in core part 70.

First support strut 38 has bottom aperture 130 and top aperture 132. Second support strut 42 has bottom aperture 140 and top aperture 141a.

In the depicted embodiment, first support strut 38 and second support strut 42 are made of metal. In various embodiments, first support strut 38 and second support strut 42 are made of other high strength materials known in the art. In the depicted embodiment, core part 70 is made of polypropylene or other blow moldable material known to those of skill in the art that is able to withstand the pressures and temperatures of the headrest assembly forming process. In alternate embodiments, core part 70 may be made of processes other than blow molding.

Such other processes may be molding, casting, extruding, or additional processes known to those of skill in the art. Core part 70 may also be made of metal (for example, aluminum), foam, or other material. In one example, core part 70 could be a flimsy aluminum that is able to withstand the pressures and temperatures of the headrest assembly forming process. The flimsy aluminum could have a thin wall thickness of 0.127-0.254 mm (0.005 to 0.010 inches). The core part 70 material should be able to withstand the pressure and temperature of the injection molding process depicted in FIGS. 5-6D so that core part 70 remains substantially in its original shape and so that the core part 70 does not dissolve. In various embodiments of the disclosure, it is contemplated that core part 70 may be a volumetric rectangular, elliptical, oval, or other shape known to those of skill in the art.

Outer shell 82 is injection molded around core part 70 with mold-in-place first support strut 38 and second support strut 42. Outer shell 82 can be molded to have an A-surface 86, which is the surface that the occupant sees. In the depicted embodiment outer shell 82 could be a polypropylene or a TPO (thermoplastic olefin). A thermoplastic olefin is a polypropylene with a fine powder. The fine powder of the thermoplastic olefin improves the texture of outer shell 82 for the bond with blow molded core part 70. In some embodiments, additional covers or layers may be placed around the headrest assembly 34.

Figure 3:
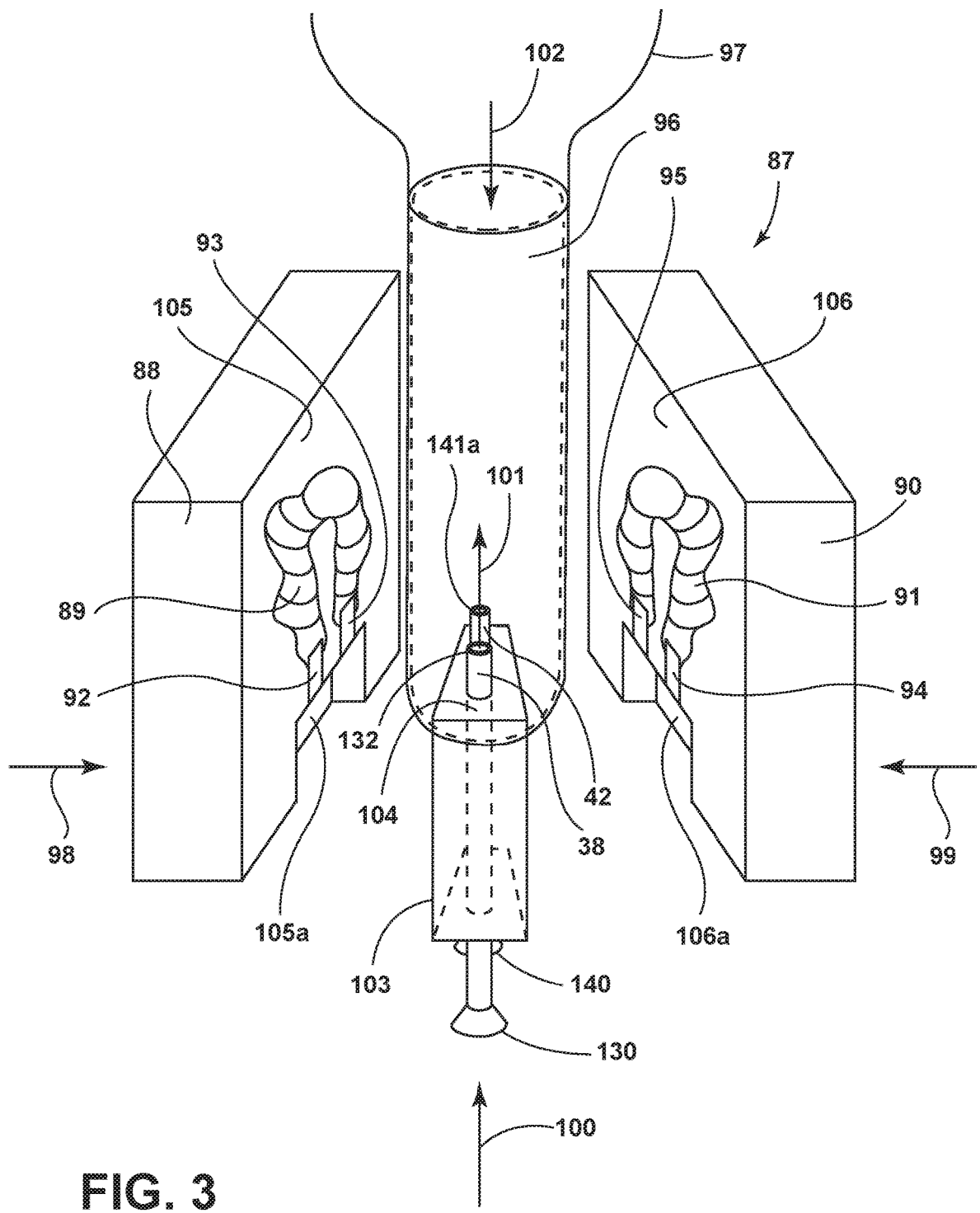
FIG. 3 is a perspective view of the first mold for forming the blow molded core part and in molded supports of the headrest assembly in the first open position of one embodiment of the present disclosure.
Figure 4:
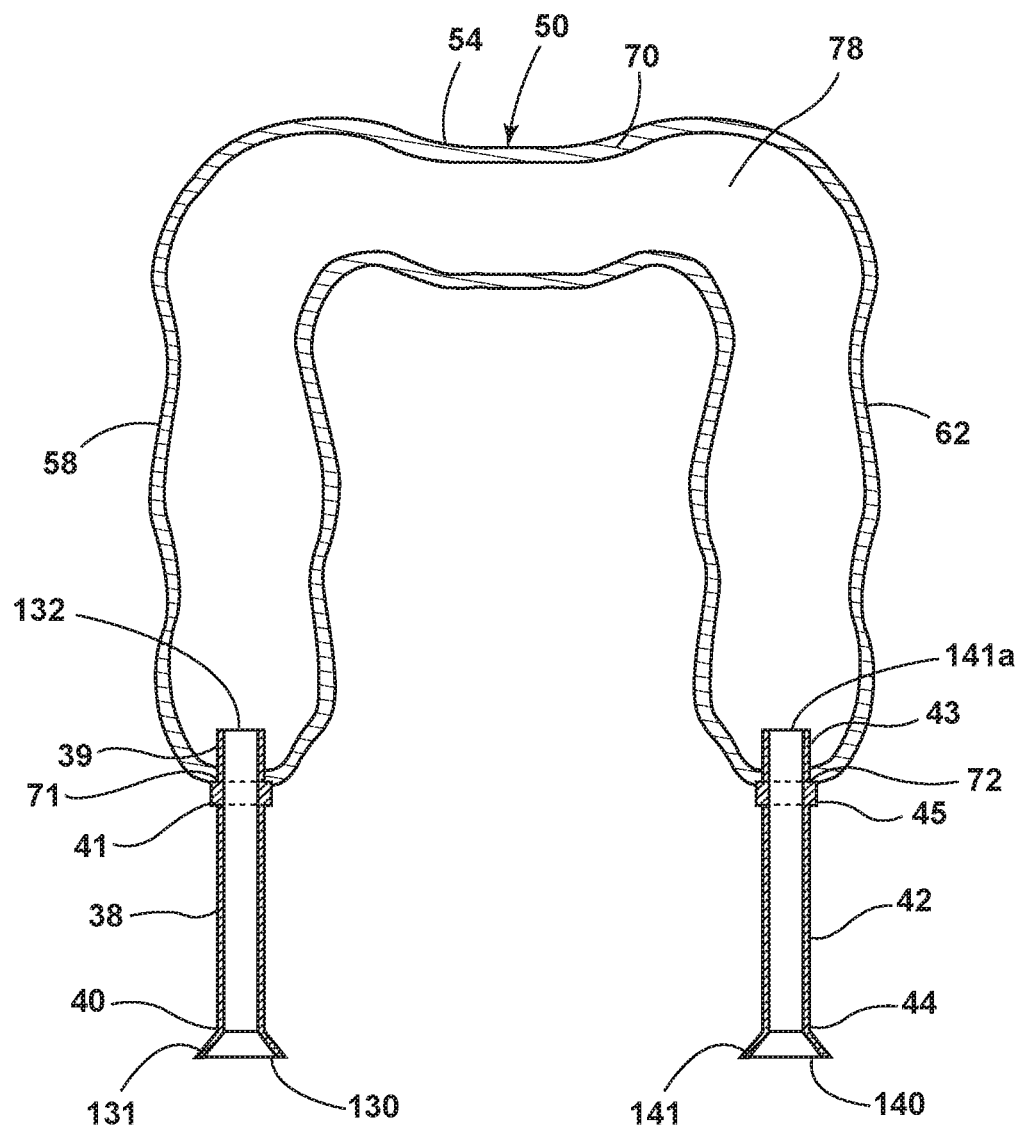
FIG. 4 is a cross-sectional view of the core part and supports formed in FIGS. 3-3B through line IV-IV of FIG. 3B according to one embodiment of the present disclosure.

Referring to FIGS. 2-4, the headrest assembly 34 core part 70 with support struts 38, 42 is blow molded by injecting air into a parison 96 that overlaps the support struts 38, 42 so that the core part 70 is overmolded around support struts 38, 42.

FIG. 3 depicts first mold 87 in the first open position of the blow molding process. A parison 96 of hot plastic is expelled from the extrusion head 97 in the direction of arrow 102 and hangs from the extrusion head 97. In the depicted embodiment, the parison 97 is a tubular resin sleeve.

A block 103 that support struts 38, 42 are housed in comes in contact with the parison 96 at the approximate parison 96 pinch off point 104.

Figure 3A:
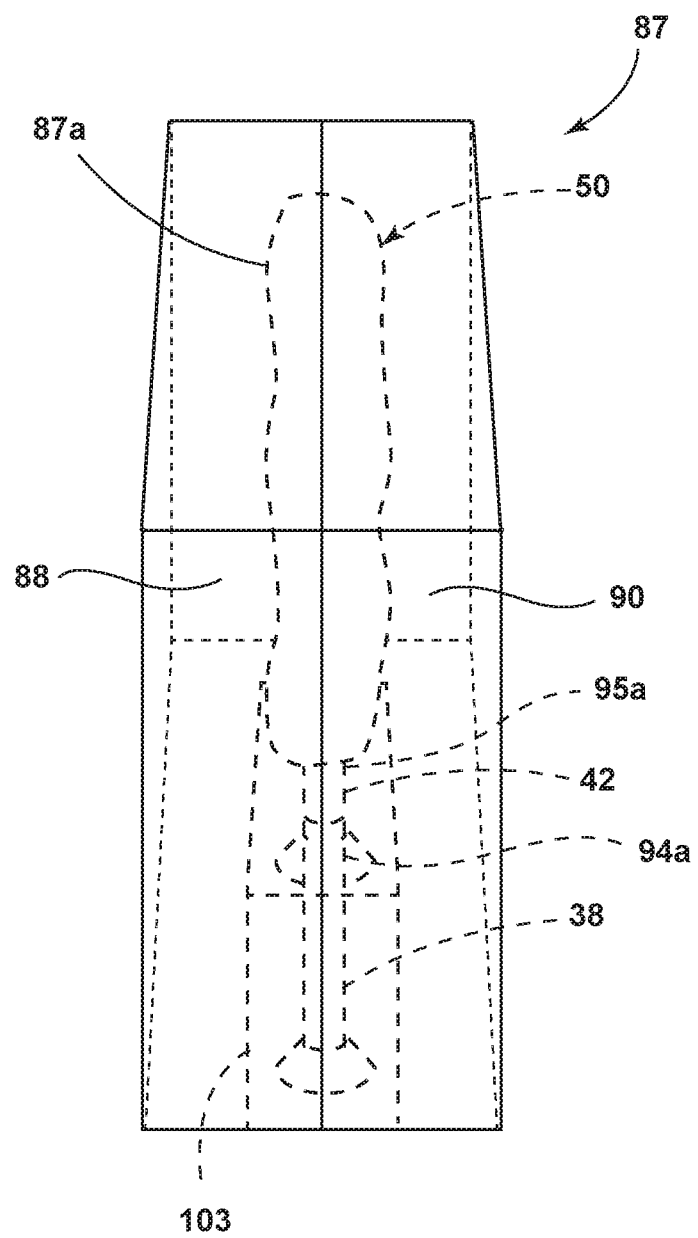
FIG. 3A is a perspective view of the first mold for forming the blow molded core part and in molded supports of the headrest assembly in the closed position of one embodiment of the present disclosure.

FIG. 3A depicts first mold 87 in the closed position. With reference to FIGS. 3 and 3A, first portion 88 and second portion 90 come together in the directions of first arrow 98 and second arrow 99, respectively, to form the first cavity 87a comprised of first channel 89 and second channel 91. More specifically, left mating surface 105 and right mating surface 106 abut each other in a closed condition to form the closed mold cavity 87a from joined first channel 89 and second channel 91. With reference to FIGS. 3 and 3A, first inset 105a and second inset 106a capture block 103. First inset 105a and second inset 106a provide a relief in first portion 88 and second portion 90, respectively, to capture block 103 in which first support strut 38 and second support strut 42 are disposed. Support recess 92 of first portion 88 and support recess 94 of second portion 90 enclose support strut 38 in first hole 94a of the first cavity 87a in the closed condition of first mold 87. Support recess 93 of first portion 88 and support recess 95 of second portion 90 enclose support strut 42 in second hole 95a of the first cavity 87a in the closed condition of first mold 87. First portion 88 and second portion 90 may be platens or any other method or apparatus known to those of skill in the art to comprise a mold.

Figure 3B:
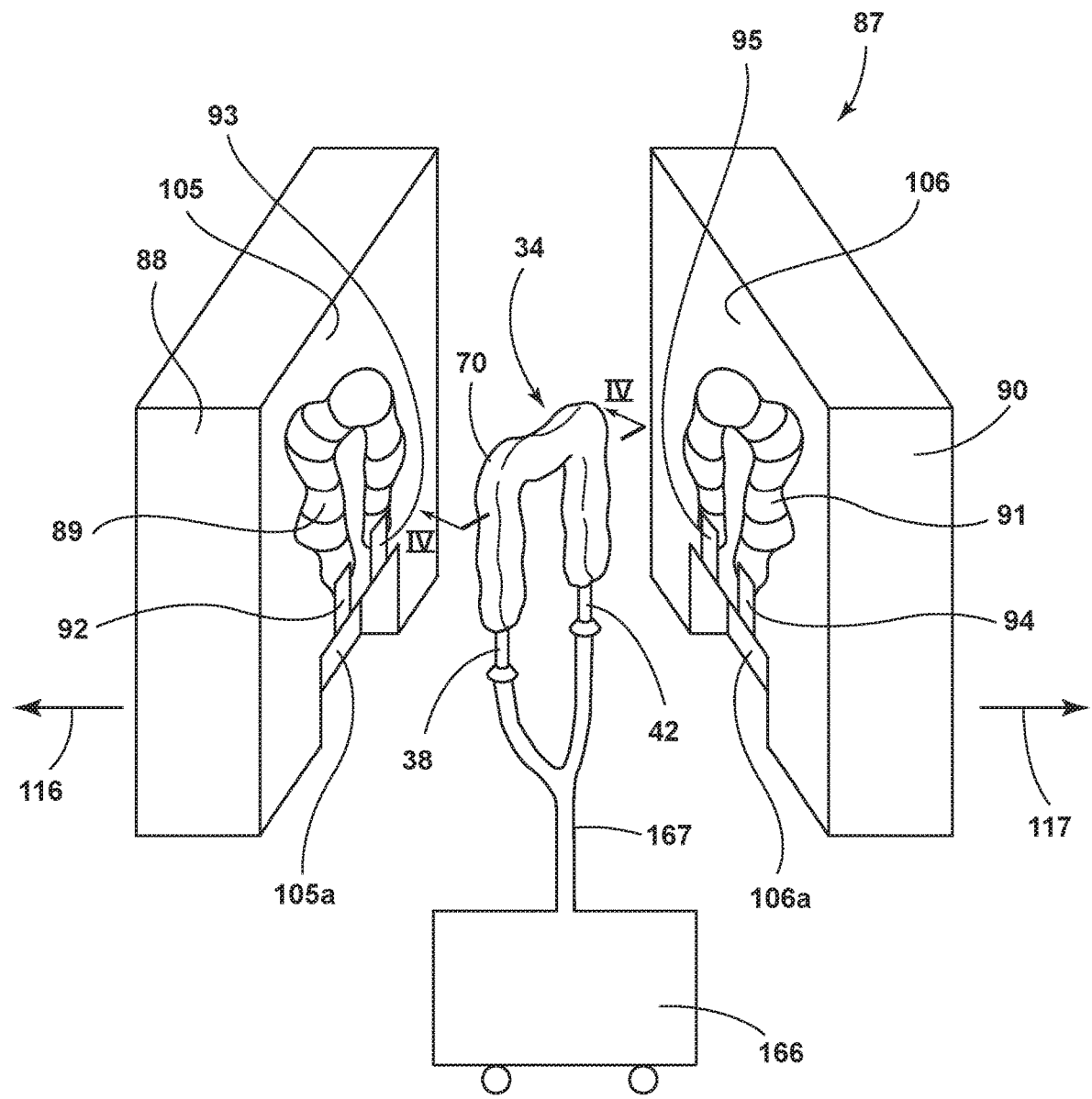
FIG. 3B is a perspective view of the first mold for forming the blow molded core part and in molded supports of the headrest assembly in the second open position of one embodiment of the present disclosure.

With reference to FIG. 3, in the first open position of first mold 87, air 100, 101 is injected through the support struts 38, 42 to inflate the parison 96. Referring to FIGS. 3, 3A, and 4, the parison 96 is overmolded over first support strut 38 and second support strut 42 at first portion 39 overmold area 71 of first support strut 38 and first portion 43 overmold area 72 of second support strut 42. FIG. 3B depicts the first mold 87 in the second open position. When the core part 70 has cured, portion 88 and portion 90 move in the first portion open direction 116 and second portion open direction 117 to release the core part 70 and support struts 38, 42 from the first channel 89 and second channel 91, support recess 93 and support recess 95, and support recess 92 and support recess 94. A robot 166 manipulator 167 affixes to the first support strut 38 and the second support strut 42 of the core part 70 to grab the headrest assembly 34 as it will be removed from the first channel 89 and the second channel 91 that comprise first cavity 87a.

Figure 4A:
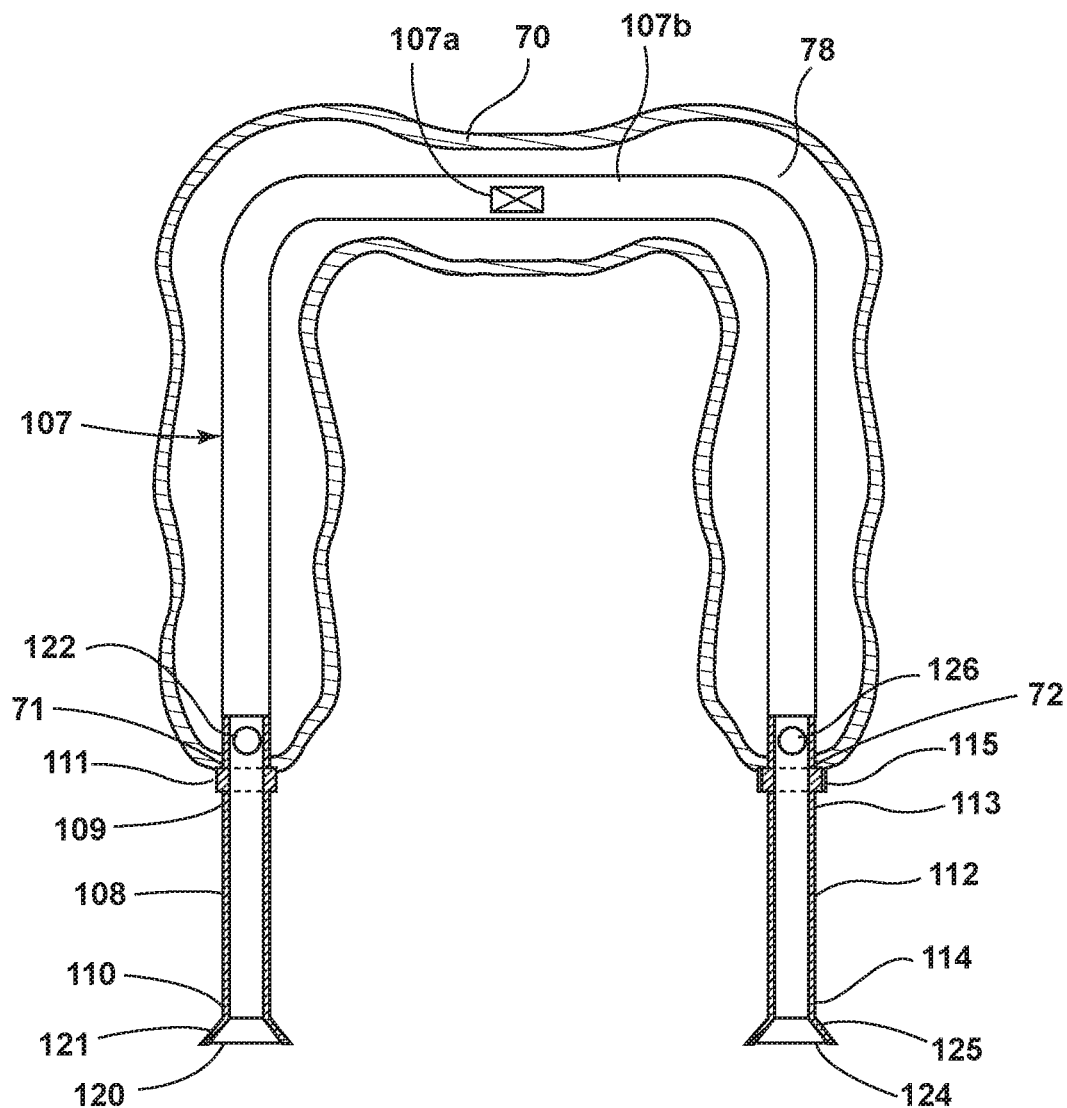
FIG. 4A is a cross-sectional view of an alternate embodiment of the core part and supports of FIG. 4 that features a "u-shaped" support of one embodiment of the present disclosure.

Referring now to FIG. 4A, an alternate embodiment of the headrest assembly of FIG. 4 is shown. FIG. 4A depicts a support 107 with a generally U-shaped configuration. In some embodiments, the U-shaped support 107 can be used in place of the first support strut 38 and second support strut 42 of FIG. 4. In the alternate embodiment of FIG. 4A, the U-shaped support 107 includes pinch point 107a where the blow molded core part 70 captures the U-shaped support 107. In the depicted embodiment, U-shaped support 107 is metal. In some embodiments, U-shaped support 107 may have a hollow cylindrical cross-section. U-shaped support 107 has first support leg 108 and second support leg 112. First support leg 108 has first portion 109 and second portion 110. Second support leg 112 has first portion 113 and second portion 114. In the depicted embodiment, first support leg 108 and second support leg 112 are metal and have hollow cylindrical cross-sections. First protrusion 111 and second protrusion 115 are located on first portion 109 of first leg 108 and second portion 113 of second leg 112. First aperture 122 and second aperture 126 are located within hollow portion 78 of core part 70. Flanges 121, 125 are located on first support leg 108 and second support leg 112, respectively, to enable pressurization of the support legs 108, 112 when a fluid is inserted into the hollow portion 78 through support legs 108, 112. The crossbar 107b is between first support leg 108 and second support leg 112.

Figure 6:
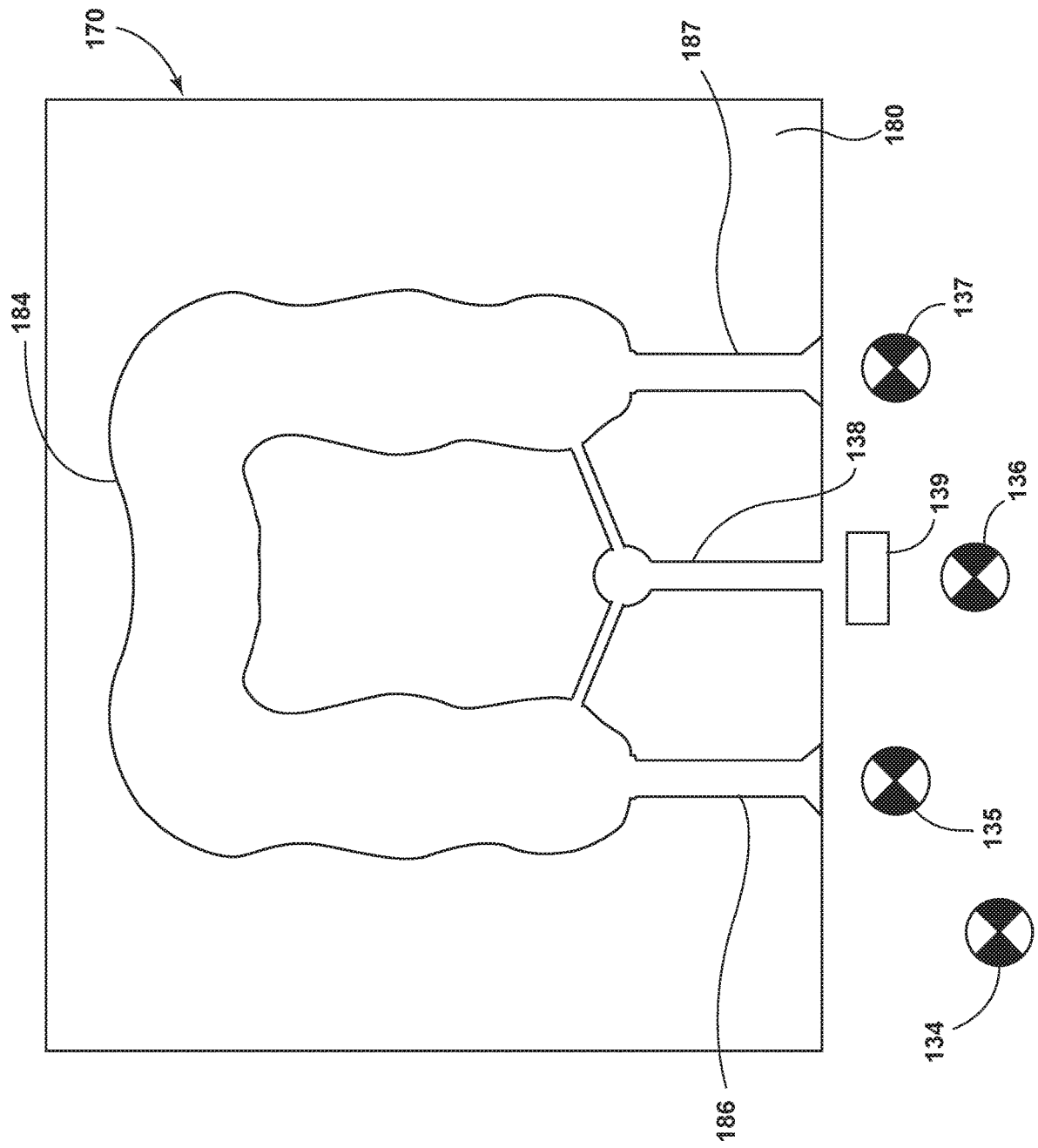
FIG. 6 is an elevational view of the empty second cavity in the bottom portion of the second mold in an open condition of one embodiment of the present disclosure.
Figure 6A:
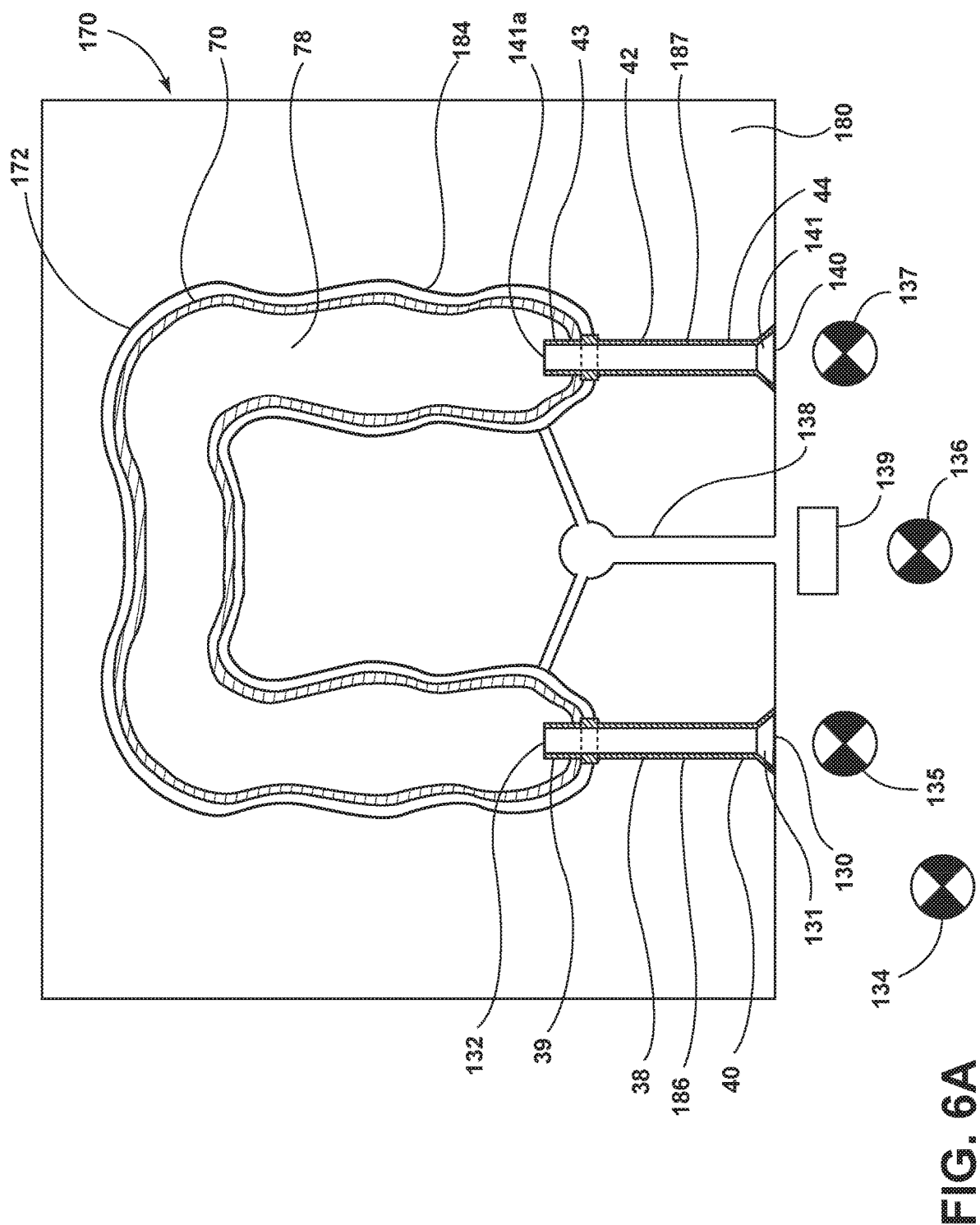
FIG. 6A is an elevational view of the second cavity in the bottom portion of the second mold in an open condition and a cross-sectional view of the core part and supports taken along IV-IV of FIG. 3B located within the second cavity of one embodiment of the present disclosure.
Figure 6B:
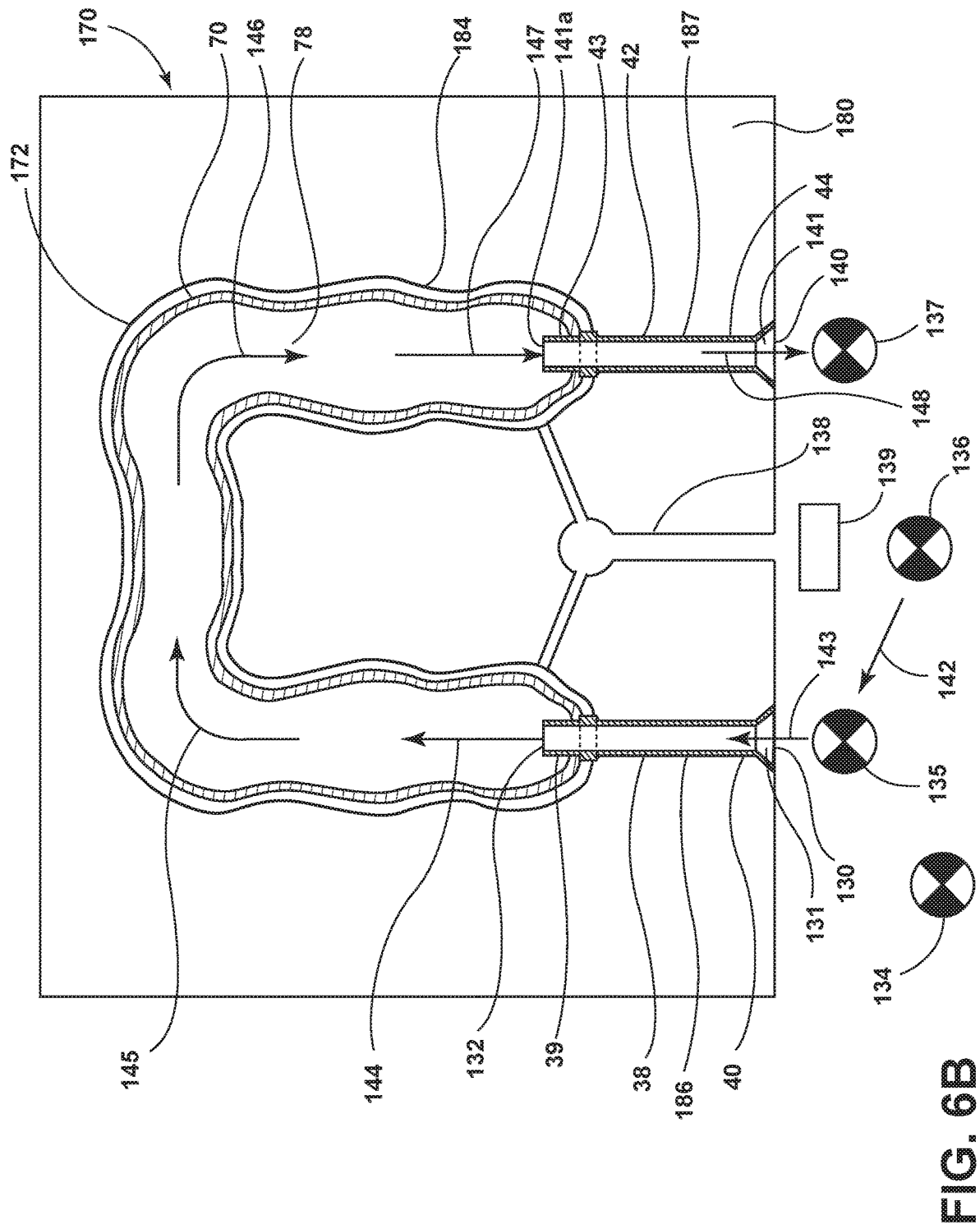
FIG. 6B is an elevational view of the second cavity in the bottom portion of the second mold in an open condition and a cross-sectional view of the core part and supports located within the second cavity and a fluid being injected through the core part and the supports according to one embodiment of the present disclosure.
Figure 6C:
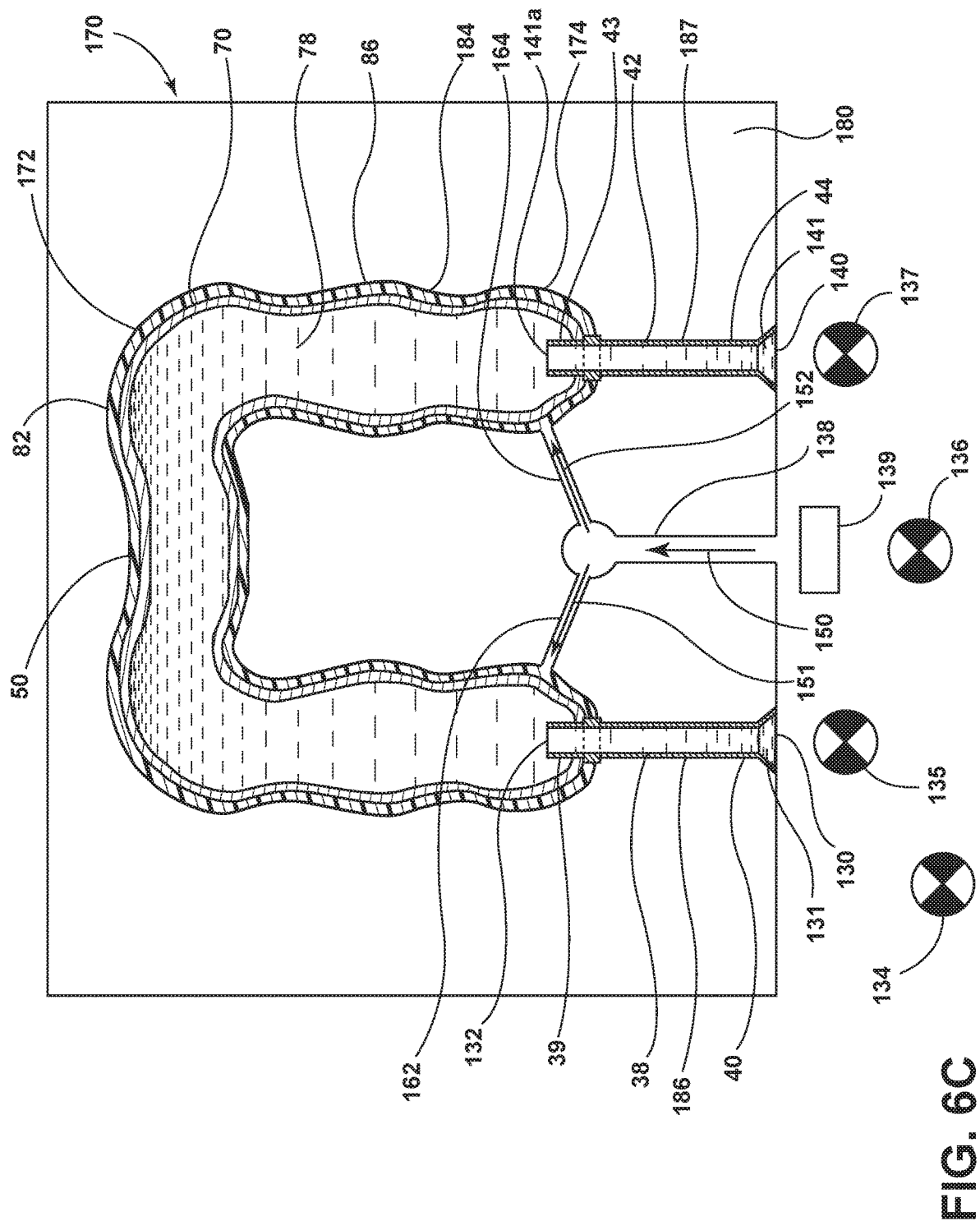
FIG. 6C is an elevational view of the second cavity in the bottom portion of the second mold in a closed condition and a cross-sectional view of the core part and supports taken along IV-IV of FIG. 3B filled with a fluid located within the second cavity and an outer shell being injection molded around the core part according to one embodiment of the present disclosure.
Figure 6D:
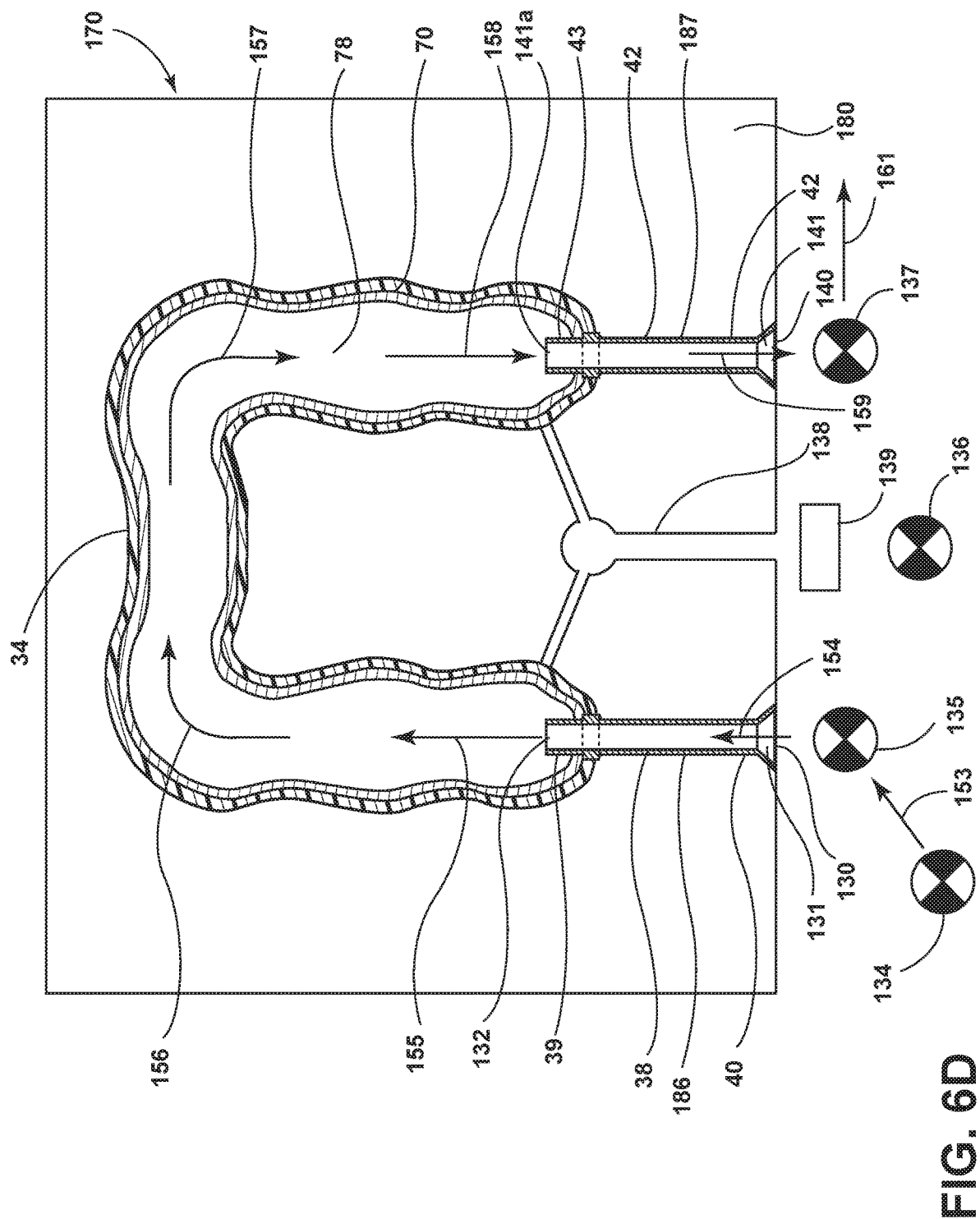
FIG. 6D is an elevational view of the second cavity in the bottom portion of the second mold in a closed condition and a cross-sectional view of an outer shell injection molded around the core part with supports of the cross-section taken along IV-IV of FIG. 3B and fluid being evacuated from the core part and supports of one embodiment of the present disclosure.

During the blow molding process depicted in FIGS. 3-3B, and the injection molding process depicted in FIGS. 5-6D, apertures 122 and 126 are openings for delivery of fluids to or evacuation of fluids from the hollow portion 78 through apertures 120 and 124, respectively.

As previously described with regard to FIG. 2, first protrusion 111 and second protrusion 115 may be washer shaped and may have knurled surfaces to allow first mold 87 and second mold 170 to squeeze around the roughened, heavily textured, knurled surfaces of first protrusion 111 and second protrusion 115 to form a water tight, mechanical seal with first mold 87 and second mold 170.

Referring to FIGS. 5 and 5A, second mold 170 is shown in open and closed positions, respectively. Second mold 170 comprises first portion 180 and second portion 182. Referring to FIG. 5, second mold 170 is shown in an open position. First channel 184 will receive core part 70. First recess 186 of first portion 180 and second recess 187 of first portion 180 provide locations for first support strut 38 and second support strut 42, respectively. Referring to FIG. 5A, second mold 170 of FIG. 5 is shown in a closed position. First portion 180 and second portion 182 come together in the first closing direction 188 and the second closing direction 189 to form the second cavity 172 comprised of first channel 184 and second channel 185. More specifically, first mating surface 181 and second mating surface 183 abut each other in a closed condition to form the closed second cavity 172 from joined first channel 184 and second channel 185. First portion 180 and second portion 182 may be platens or any other method or apparatus known to those of skill in the art to comprise a mold.

FIGS. 5 and 5A depict the second mold 170 generally. The second mold 170 may be oriented differently than it is depicted in FIGS. 5 and 5A. For example, first portion 180 and second portion 182 may be oriented vertically.

Referring now to FIGS. 6-6D, the over molding process for molding outer shell 82 around core part 70 is shown. FIG. 6 depicts a top view of first portion 180 with empty first channel 184, empty first recess 186, and empty second recess 187. FIG. 6 also schematically depicts first control 134, second control 135, third control 136, and fourth control 137 for controlling the flow of fluid during the overmolding process. Fluid used during the overmolding process may include water, air, oil, or other fluid known to those of skill in the art. Injection molding channel 138 shows the route for injecting material from the tool 139 for forming the outer shell 82 into the second cavity 172. Tool 139 may be an injection molding tool drop. Second control 135 and fourth control 137 may act as shut off valves.

FIG. 6A shows the core part 70 with first support strut 38 and second support strut 42 placed in the first channel 184, first recess 186, and second recess 187 of first portion 180 of second mold 170. FIG. 3B depicts a robot 166 removing the core part 70 with first support strut 38 and second support strut 42 from first mold 87. A robot 166's manipulator 167 clamps onto the two support struts 38, 42. The manipulator 167's pressure seal presses onto the second portion 40 of first support strut 38 and second portion 44 of second support strut 42. Robots typically move parts from one location to another in a manufacturing facility. Manipulator 167 is attached to robot 166 and can insert fluids such as air, water, oil, or other fluids known to those of skill in the art into first support strut 38 and/or second support strut 42. Manipulator 167 can also evacuate fluids such as air, water, oil, or other fluids known to those of skill in the art from first support strut 38 and/or second support strut 42 while the robot grips first support strut 38 and second support strut 42. The manipulator 167 may include means for delivering a fluid (for example, air, water, oil, or other fluids known to those of skill in the art) to the interior of the core part 70 through support strut 38 and/or support strut 42. The manipulator 167 may also include means for removing a fluid (for example, air, water, oil, or other fluids known to those of skill in the art) from the interior of the core part 70 through support strut 38 and/or support strut 42. Manipulator 167 generally represents a robot component known to those of skill in the art. An industrial robot is generally comprised of a robot manipulator, power supply, and controllers. A manipulator may be molded as a chain of rigid links interconnected by flexible joints.

With reference to FIG. 6A, the robot 166 may move the core part 70 with in-molded first support strut 38 and in-molded second support strut 42 into the first channel 184 of first portion 180. The robot injects water into the aperture 130 of hollow, cylindrical first support strut 38. Flanges 131 and 141 are on the second support portions 40, 44 of first and second support struts 38, 42, respectively. Flanges 131, 141 enable pressurization by absorbing loads.

FIGS. 6-6D do not depict a robot 166. The controls for delivering fluid and/or water to the second mold 170 are schematically depicted as first control 134, second control 135, third control 136, and fourth control 137. In various embodiments, a robot may perform the functions of first control 134, second control 135, third control 136, and/or fourth control 137. In the depicted embodiment, first control 134 acts as an air source valve, second control 135 acts as an inlet valve, third control 136 acts as a water source valve, and fourth control 137 acts as an exhaust valve.

With reference to FIG. 6B, core part 70 with first support strut 38 and second support strut 42 have been placed in first channel 184, first recess 186, and second recess 187 of portion 180. In the depicted embodiment, a directional hydro-injection method is used to fill the empty core part 70 with water. Water is released from third control 136 and flows to second control 135 along fluid path 142. Thereafter the water is let into the aperture 130 of support 38 as fluid flow 143. The fluid flows into hollow portion 78 of core part 70 as fluid flow 144. The water continues to fill the hollow portion 78 as fluid flows 145, 146, 147. Water continues into the support strut 42 as fluid flow 148. Fourth control 137 acts as a shut off valve to stop the flow of water from leaving the core part 70 and support struts 38, 42. In the depicted embodiment, fourth control 137 is a water flow stopcock that is tightened so that the water pressure in the core part 70 and within hollow first support strut 38 and hollow second support strut 42 remains constant. In the depicted embodiment, the water filled core part 70 may have a pressure in the range of 10 psig to 30 psig (68 kPa to 207 kPa). In one embodiment, the water in core part 70 is incompressible and provides a semi rigid core. In the depicted embodiment, the fluid used in the hydro-injection method is water. In various embodiments, the fluid may be oil or any other fluid known to one of skill in the art.

With reference to FIGS. 5, 5A, and 6C, the second mold 170's second portion 182 with channel 185 closes over the fluid filled core part 70 in the first channel 184 of first portion 180. The first recess 190 and the second recess 191 of second portion 182 close over fluid filled first support strut 38 and fluid filled second support strut 42 as they lay in first recess 186 and second recess 187 of first portion 180. The second mold 170 closes over the water filled core part 70, first support strut 38, and second support strut 42 as the water flow stopcock of fourth control 137 closes, locking water into the core part 70. The outer shell 82 is molded around the core part 70 and supports 38 and 42. Material for the outer shell 82 flows from tool 139, into injection molding channel 138 as fluid flow 150, into first runner 162 as fluid flow 151, and into second runner 164 as fluid flow 152. The material for the outer shell 82 flows into the area between core part 70 and the walls 174 of the second cavity 172. The material for the outer shell 82 is injected into the second cavity 172 to fill the gap between the core part 70 and the walls 174 of second cavity 172. In the depicted embodiment, the second mold 170 utilizes a high pressure injection molding tool 139. In the depicted embodiment, the water in the core part 70 is incompressible and provides a semi-rigid core. In other embodiments, oil or other fluids may be used in the core part 70. The fluids may be temperature adjusted to manage cooling rates in the molded part to reduce process time. In the depicted embodiment, as the water increases in temperature, a very small increase in volume will take place further pressing the external A-surface 86 of outer shell 82 into the second cavity 172 walls 174 and minimizing localized shrink defects. In the depicted embodiment, shrinkage in the outer shell 82 is automatically corrected by the water-filled flexible and slightly pressurized core part 70. Locally thicker sections of outer shell 82 can be tolerated without surface depressions on A-surface 86.

Referring to FIGS. 5, 5A, and 6D, after the headrest assembly has cured and prior to opening the second mold 170, the water pressure is released by opening control 137, which acts as a water flow stopcock. Water leaves the core part 70 hollow portion 78 and first support strut 38 through second support strut 42 in the directions depicted by fluid flows 155, 156, 157, 158, and 159. Fourth control 137 which acts as an exhaust valve is opened to allow water to exit through the second support strut 42 in the direction of fluid flow 161. Thereafter, residual water is exhausted from first support strut 38, hollow portion 78 of core part 70, and second support strut 42 with a blast of compressed air that flows from first control 134 to second control 135 as fluid flow 153. The compressed air then flows as fluid flows 154, 155, 156, 157, 158, and 159 through the support strut 38, hollow portion 78, and support strut 42 to remove residual water from support strut 38, hollow portion 78, and support strut 42. Air flows through fourth control 137 and leaves as fluidflow 161. Thereafter, the second mold 170 opens, the headrest assembly 34 is removed, released from the robot 166, and laid into a trimming nest. The trimming nest indexes to the next station where the flanged ends 131 and 141 of first support strut 38 and second support strut 42, respectively, are cut off and de-burred.

It is to be understood that fluid may enter and/or leave the hollow portion 78 of core part 70 in different flow directions than those depicted in FIGS. 6-6D. In one example, fluid may enter the hollow portion 78 through both supports 38 and 42 simultaneously and leave the hollow portion 78 through one or both support struts 38, 42 apertures 130, 140. In the embodiment of FIG. 6D, the water and air are shown entering the hollow portion 78 through support strut 38 and evacuating the hollow portion 78 through support strut 42. However, it is contemplated that a single support may be used to introduce water, air, oil, or any other fluid known to those of skill in the art into the core part 70 wherein that same single support is also used to evacuate water, air, oil, or any other fluid known to those of skill in the art from the core part 70. It is further contemplated that more than two supports may be used without departing from the spirit of the present disclosure.

The headrest assembly is thus ready for use in the vehicle seat 10, as depicted in FIG. 1. In the depicted embodiment, outer shell 82 A-surface 86 is molded in such a way that it can be a finished product that can be installed in a vehicle without further additions to the headrest assembly 34. In various embodiments, headrests with assorted volumetric shapes having various cross-sections (for example, elliptical, oval, rectangular, and/or other cross-sections) may be formed using all or part of the processes of the depicted embodiment. In various embodiments, core part 70 may be made by a blow molding process or other processes known in the art. In various embodiments, the core part 70 may be affixed to the first support strut 38 and the second support strut 42 by in-molding, over molding, or other coupling means known in the art.

Figure 7:
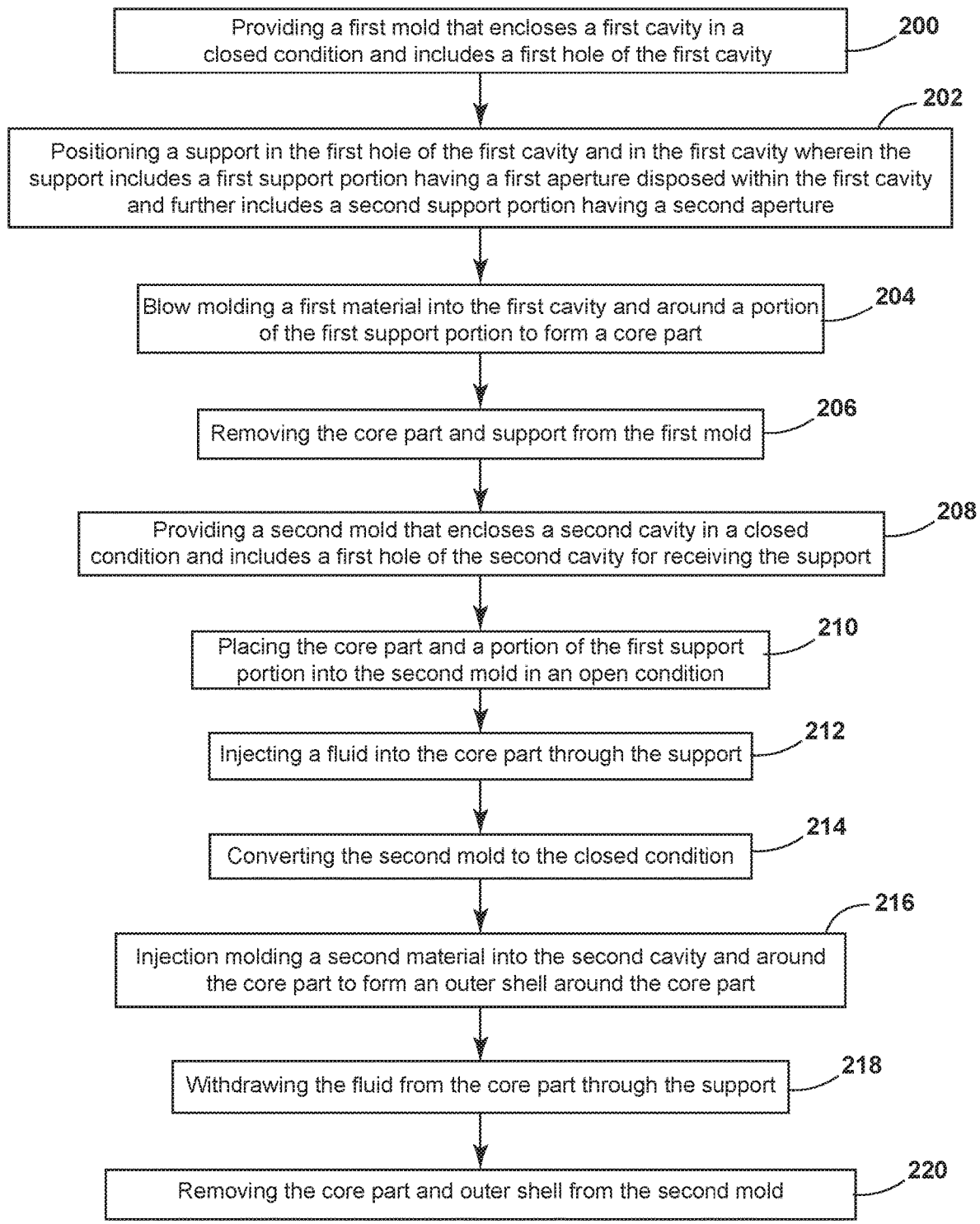
FIG. 7 is a flow diagram of a method for forming a vehicle headrest assembly according to one embodiment of the present disclosure.

FIG. 7 depicts a flow chart of the method of forming a headrest assembly of the depicted embodiment. Step 200 provides for providing a first mold that encloses a first cavity in a closed condition and includes a first hole of the first cavity. Step 202 provides for positioning a support in the first hole of the first cavity and in the first cavity, wherein the support includes a first support portion having a first aperture disposed within the first cavity and further includes a second support portion having a second aperture. Step 204 provides for blow molding a first material into the first cavity and around a portion of the first support portion to form a core part. Step 206 provides for removing the core part and support from the first mold. Step 208 instructs providing a second mold that encloses a second cavity in a closed condition and includes a first hole of the second cavity for receiving the support. Step 210 directs placing the core part and a portion of the first support portion into the second mold in an open condition. Step 212 states injecting a fluid into the core part through the support. Step 214 provides for converting the second mold to the closed condition. Step 216 provides for injection molding a second material into the second cavity and around the core part to form an outer shell around the core part. Step 218 directs withdrawing the fluid from the core part through the support. Step 220 directs removing the core part and outer shell from the second mold.

A variety of advantages may be derived from the use of the present disclosure. A lightweight headrest assembly is provided. The headrest assembly is manufactured efficiently. The headrest structure is utilized to aid in making the headrest assembly. The headrest assembly may be a high strength, fully styled, large cross section, light weight product.

The method and device disclosed in the current disclosure may also be used to fabricate various vehicle parts (bolsters, pillows, cushions, and the like), furniture products, toys, and other items.

It will be understood by one having ordinary skill in the art that construction of the described device and other components may not be limited to any specific material. Other exemplary embodiments of the device disclosed herein may be formed from a wide variety of material, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical and mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is to be understood that variations and modifications can be made on the afore-mentioned structure without departing from the concepts of the present disclosure, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the disclosure, which are defined by the following claims as interpreted according to the principles of patent law, including the Doctrine of Equivalents.

What is claimed is:

1. A method for injection molding a headrest bun, comprising:
    forming a hollow core part around a support such that the support extends away from the hollow core part;
    injecting a fluid into the hollow core part through the support;
    injection molding an outer shell around the hollow core part; and
    removing the fluid from the hollow core part.

2. The method of claim 1, wherein forming a hollow core part around a support such that the support extends away from the hollow core part comprises:
    injecting air into a parison disposed around the support through the support to blow mold the hollow core part.

3. The method of claim 1, wherein the hollow core part is U shaped.

4. The method of claim 1, further comprising:
    forming the hollow core part from aluminum.

5. The method of claim 1, wherein removing the fluid from the hollow core part comprises:
    removing the fluid from the hollow core part through the support.

6. The method of claim 5, wherein the support includes a first support and a second support, and wherein injecting the fluid into the hollow core part through the support comprises:
    injecting the fluid into the hollow core part through the first support, and wherein removing the fluid from the hollow core part through the support comprises:
    removing the fluid from the hollow core part through the second support.

7. The method of claim 6, wherein the first support includes a first strut, and wherein the second support includes a second strut.

8. The method of claim 7, wherein the first strut and the second strut are slidably receivable in a seatback.

9. The method of claim 8, wherein the first and second struts each include first and second apertures.

10. The method of claim 9, wherein the first strut and the second strut each include knurled portions disposed between the first and second apertures.

11. The method of claim 9, wherein the first aperture is disposed in the hollow core part, and wherein the second aperture is disposed outside of the hollow core part.

12. The method of claim 1, wherein the support includes a first strut and a second strut, and wherein injecting a fluid into the hollow core part through the support comprises:
    injecting the fluid into the hollow core part through the first strut and the second strut.

13. The method of claim 12, wherein removing the fluid from the hollow core part comprises:
    removing the fluid from the hollow core part through the first strut or the second strut.

14. The method of claim 12, wherein removing the fluid from the hollow core part comprises:

removing the fluid from the hollow core part through the first strut and the second strut.

15. The method of claim 12, wherein injecting the fluid into the hollow core part through the first strut and the second strut comprises:

simultaneously injecting the fluid into the hollow core part through the first strut and the second strut.

16. The method of claim 14, wherein removing the fluid from the hollow core part through the first strut and the second strut comprises:

simultaneously removing the fluid from the hollow core part through the first strut and the second strut.

17. A method for forming a core part, comprising:

forming a hollow core part around a hollow support extending away from the hollow core part and including a first aperture of the hollow support disposed in the hollow core part and a second aperture of the hollow support disposed outside of the hollow core part;

injecting fluid into the hollow support to fill the hollow core part with a fluid;

filling the hollow core part with a fluid;

molding an outer shell around the hollow core part; and removing fluid from the hollow core part through the hollow support to empty fluid from the hollow core part.

18. The method of claim 17, further comprising the step of:

closing a valve disposed proximate the hollow support to retain the fluid in the hollow core part.

19. The method of claim 18, further comprising the step of:

opening a valve disposed proximate the hollow support to release the fluid from the hollow core part.

20. A method for injection molding a vehicle headrest, comprising:

blow molding a hollow core part around first and second struts extending into the hollow core part by injecting air through the first and second struts into a parison disposed in a mold;

injecting a fluid into the hollow core part through one or more of the first and second struts;

injection molding an outer shell around the hollow core part; and evacuating the fluid from the hollow core part through one or more of the first and second struts.

* * * * *